Figure 1:
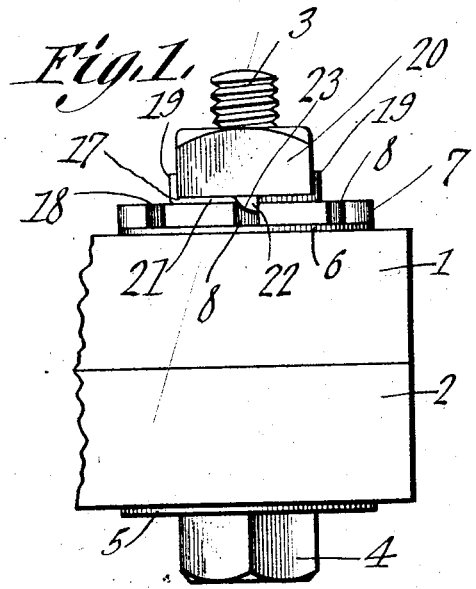

June 23, 1925.  
E. B. DE LOE  
LOCK WASHER  
Filed July 12, 1924  
1,543,282

Inventor  
E. B. DeLoe  
By C. A. Snow & Co.  
Attorneys

Patented June 23, 1925.

1,543,282

UNITED STATES PATENT OFFICE.

EDGAR BURDETTE DE LOE, OF SAPULPA, OKLAHOMA.

LOCK WASHER.

Application filed July 12, 1924. Serial No. 725,646.

*To all whom it may concern:*

Be it known that I, EDGAR B. DE LOE, a citizen of the United States, residing at Sapulpa, in the county of Creek and State of Oklahoma, have invented a new and useful Lock Washer, of which the following is a specification.

This invention aims to provide a simple means for locking a nut and a bolt against relative rotation, a portion of the device being so constructed that it can be placed in different positions to present different parts thereof to the bolt, thereby increasing and lengthening the effective life of the device.

It is within the province of the disclosure to improve generally and to enhance the utility of devices of that sort to which the invention appertains.

Although a preferred form of the invention has been shown in the drawings, it will be understood that a mechanic, working within the scope of what is claimed, may make changes without departing from the spirit of the invention.

Figure 2:
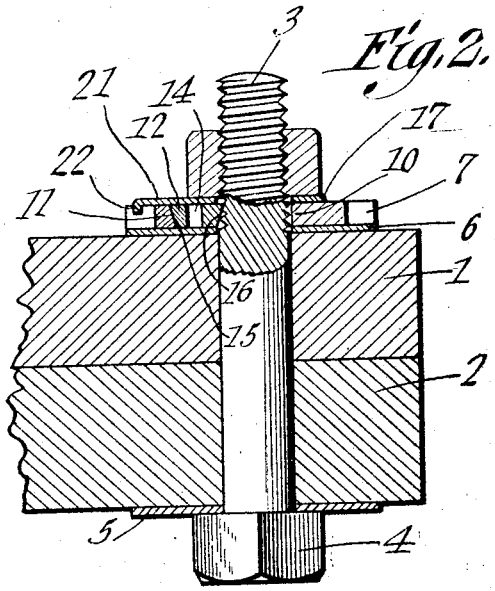
Figure 3:
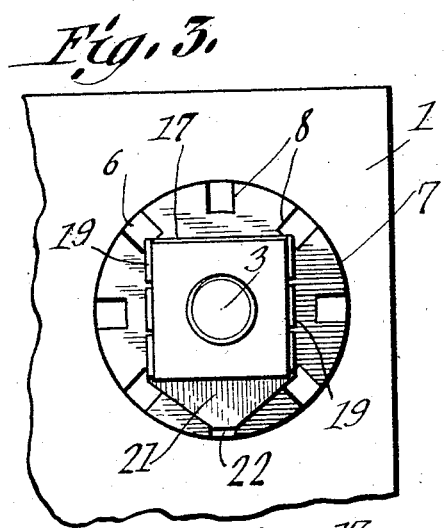
Figure 4:
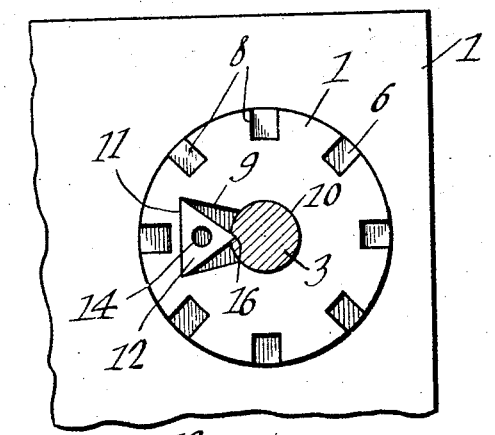
Figure 5:
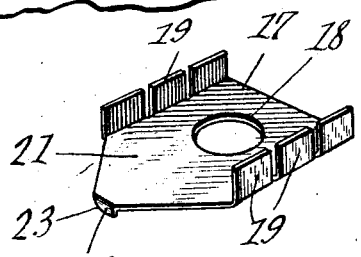
Figure 6:
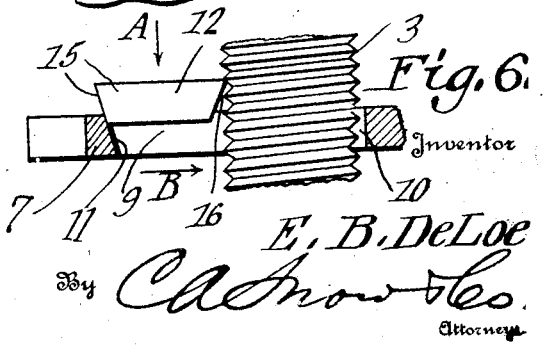

In the drawing:—Figure 1 shows in elevation, a device constructed in accordance with the invention; Figure 2 is a sectional view wherein parts appear in elevation; Figure 3 is a plan; Figure 4 is a cross section showing the ratchet washer and the locking member; Figure 5 is a perspective disclosing the pawl washer; Figure 6 is a diagrammatic section illustrating the operation of the locking member.

The numerals 1 and 2 mark two pieces of material through which passes a bolt 3 having a head 4, a common washer 5 being interposed, if desired, between the head 4 and the piece of material 2. A similar washer 6 may be mounted on the bolt 3 in contact with the piece 1 of material.

A ratchet washer 7 surrounds the bolt 3 and rests on the washer 6. The ratchet washer 7 has ratchet slots 8, located in its periphery, or elsewhere. The ratchet washer 7 is provided with an opening or seat 9 communicating with the bolt receiving opening 10 of the washer 7. The outer wall of the opening or seat 9 is inclined as shown at 11. In the opening 9 is located a locking member 12 in the form of an equilateral triangle, the locking member cooperating with the washer 6. The locking member 12 has a hole 14 adapted to receive a suitable tool of any kind (not shown), whereby the locking member can be plucked readily out of the opening 9 in the washer 7. All of the edges of the locking member 12 are inclined as at 15, to correspond with the slope of the wall 11 of the opening 9 in the washer 7. At each corner of the triangular locking member 12, an inclined cutting edge 16 is formed, because the edges of the locking member are inclined as at 15.

The numeral 17 denotes a pawl washer having an opening 18 for the reception of the bolt 3, the washer 17 being provided with flanges 19, adapted to receive the nut 20 which is threaded on the bolt 3, the construction being such that when the nut 20 is rotated, the washer 17 will be rotated likewise. The washer 17 has some resiliency and includes an extension 21 having an angularly disposed pawl 22 provided with an inclined edge 23.

When the nut 20 is rotated to a seat, the washer 17 is rotated also, the inclined edge 23 of the pawl 22 on the washer 17 clicking over the ratchet slots 8 of the washer 7, because the pawl 22 has an inclined edge 23. When, however, it is attempted to rotate the nut 20 reversely, the pawl 22 will engage in one of the ratchet slots 8 of the washer 7 and prevent such reverse rotation, provided that the washer 7 is coupled to the bolt 3. Passing to the means for coupling the washer 7 to the bolt 3, and noting Figure 6, it will be observed that the nut 20 and washer 17 will move the locking member 12 in the direction of the arrow A in Figure 6, that is, parallel to the axis of the bolt 3. Owing to the relative inclination of the edge 15 of the locking member in Figure 6, and to the inclination of the wall 11 of the opening 9 in the washer 7, the locking member 12 will be carried in the direction of the arrow B in Figure 6, that is, in a direction at right angles to the axis of the bolt. The result is that a compound movement is given to the locking member 12 which causes its edge 16 to cut a groove in the threads of the bolt 3, thereby coupling the washer 7 to the bolt.

It is to be observed that any of the edges of the locking member 12 may be placed against the inclined wall 11 of the opening 9 in the washer 7, and, similarly, any of the inclined cutting edges 16 may be presented to the bolt 3. The result is that no particular pains may be exercised in placing the locking member 12 in the opening 9, and, further, the locking member has three cutting edges 16, any one of which may be presented to the bolt, if one or more of the other cutting edges happens to be dulled or distorted.

I claim:—

1. In a device of the class described, a bolt, a washer on the bolt and having an opening, a locking member in the opening and engaged at one of its angles with the bolt, and a nut on the bolt and cooperating with the locking member to advance the locking member into the opening and into engagement with the bolt, the locking member being in the form of an equilateral triangle, to the end that any one of its angles may be presented to the bolt, and means for coupling the nut to the washer.

2. A device of the class described, constructed as set forth in claim 1, and further characterized by the fact that one wall of the opening is inclined, all of the edges of the locking member being correspondingly inclined.

3. A device of the class described, constructed as set forth in claim 1, and further characterized by the fact that the coupling means consists of a pawl and ratchet mechanism.

In testimony that I claim the foregoing as my own, I have hereto affixed my signature.

EDGAR BURDETTE DE LOE.